(12) United States Patent
Fichou et al.

(10) Patent No.: US 6,765,873 B1
(45) Date of Patent: Jul. 20, 2004

(54) CONNECTIONS BANDWIDTH RIGHT SIZING BASED ON NETWORK RESOURCES OCCUPANCY MONITORING

(75) Inventors: Aline Fichou, La Colle s/Loup (FR); Claude Galand, Domaine Crescentia (FR); Jean-Francois Le Pennec, Nice (FR)

(73) Assignee: International Business Machines Corporation, Armonk, NY (US)

(*) Notice: Subject to any disclaimer, the term of this patent is extended or adjusted under 35 U.S.C. 154(b) by 747 days.

(21) Appl. No.: 09/607,176

(22) Filed: Jun. 29, 2000

(30) Foreign Application Priority Data

Jul. 13, 1999 (EP) ............................................ 99480063

(51) Int. Cl.[7] ................................................ H04J 3/14
(52) U.S. Cl. .................... 370/235; 370/230; 370/395.2; 370/468
(58) Field of Search ................................. 370/235, 468, 370/230, 232, 233, 234, 253, 395.21, 395.4

(56) References Cited

U.S. PATENT DOCUMENTS

| | | | | |
|---|---|---|---|---|
| 5,313,454 A | | 5/1994 | Bustini et al. ................. 370/13 |
| 6,097,722 A | * | 8/2000 | Graham et al. ......... 370/395.21 |
| 6,452,905 B1 | * | 9/2002 | Smith et al. .............. 370/236.1 |
| 6,453,351 B1 | * | 9/2002 | Endo ........................... 709/229 |
| 6,459,682 B1 | * | 10/2002 | Ellesson et al. ............. 370/235 |
| 6,535,484 B1 | * | 3/2003 | Hughes et al. .............. 370/230 |

FOREIGN PATENT DOCUMENTS

| | | | |
|---|---|---|---|
| EP | 0 781 068 A1 | 6/1997 | ........... H04Q/11/04 |
| WO | WO 98/49862 | 11/1998 | ........... H04Q/11/04 |

* cited by examiner

*Primary Examiner*—Dang Ton
*Assistant Examiner*—Tri H. Phan
(74) *Attorney, Agent, or Firm*—Daniel E. McConnell; Dillon & Yudell LLP

(57) ABSTRACT

Disclosed herein is a connection bandwidth management process and system for use in a high speed packet switching network. The network comprises a plurality of switching nodes interconnected through a plurality of communication links. Each of the switching nodes comprises means for switching packets from at least one input link to at least one output link. Each of the output links are coupled to at least one buffer in the switching node for queuing packets before they are transmitted over the output link. Each of the communication links supports the traffic of a plurality of user connections statistically multiplexed over the link. Each user connection is allocated an initial agreed-upon bandwidth through the network, with each of the communication links being possibly oversubscribed.

20 Claims, 8 Drawing Sheets

Connection Table

| Connection ID | CIR (Kbps) | BC (Kb) | Be (Kb) | Access Rate (Kbps) | CRF | NCIR (Kbps) |
|---|---|---|---|---|---|---|
| C1 | 200 | 20 | 10 | 512 | 4 | 50 |
| C2 | 64 | 30 | 20 | 512 | 1 | 64 |
| .. | .. | .. | .. | ... | .. | .. |

FIG.7A

Link Table

| Link ID | Right Sizing Factor (LRF) | Oversubscript Factor (OVF) |
|---|---|---|
| L1 | 4 | 400 |
| .. | .. | .. |

FIG.7B

CONNECTIONS BANDWIDTH RIGHT SIZING BASED ON NETWORK RESOURCES OCCUPANCY MONITORING

CROSS REFERENCE TO RELATED APPLICATION

This application claims priority from European application 99480063.9, filed Jul. 13, 1999 (MM/DD/YY), which is hereby incorporated by reference. The contents of the present application are not necessarily identical to the contents of the priority document.

BACKGROUND OF THE INVENTION

1. Technical Field

The invention relates to high-speed packet switched networks. More particularly, the invention relates to a connection bandwidth management process and system which rely on an efficient monitoring of the network resources occupancy to re-compute the bandwidth allocated to connections boarded on a given link so that the overall bandwidth capacity of the link is not exceeded.

2. Description of the Related Art

The emergence of high speed networking technologies such as ATM cell-based or Frame Relay based technologies, now makes possible the integration of multiple types of traffic having different quality of service requirements (QoS), like speech, video and data, over the same communication network, which is often referred to as a "broadband" network. The communication circuits which may be shared in such network include transmission lines, program controlled processors, nodes or links, and data or packets buffers. Traffic QoS requirements are taken into account during the path selection process, and can be defined as a set of measurable quantities or parameters that describe the user's perception of the service offered by the network. Such parameters include the connection setup delay, the connection blocking probability, the loss probability, the error probability, the end-to-end transit delay and the end-to-end delay variation also referred to as jitter. Real-time traffics have more constraining requirements than non-real-time ones i.e. end-to-end delays and jitters. It is necessary to be able to give priority to the real-time packets in order to minimize these delays. Meanwhile, the packet loss must be guaranteed both for real-time and non-real-time applications which have reserved bandwidth in the network, while it is not mandatory for non-reserved type of traffic.

In this context, network users want the ability to request and be granted service level agreements (SLAs). An SLA is an agreement by the network provider to supply a guaranteed level of connectivity for a given price. The agreement is reciprocal in that the user also commits not to go beyond a certain level of network usage. The level of connectivity can be expressed in many ways, including the following: the Bandwidth (number of bits per second), the Latency (end-to-end delay), the Availability (degree of uninterrupted service), the Loss Probability, and the Security (guarantee that only the intended parties can participate in a communication).

Another important objective of the networks providers is to optimize the network resources utilization. Indeed, communication networks have at their disposal limited resources to ensure an efficient packets transmission, and while transmission costs per byte continue to drop year after year, transmission costs are likely to continue to represent the major expense of operating future telecommunication networks as the demand for bandwidth increases. More specifically, considering wide area networks (also referred to as "backbone networks"), the cost of physical connectivity between sites is frequently estimated at 80% of the overall cost. The connectivity can come in the form of a leased line, X.25 service, frame relay bearer service (FRBS), ATM bearer service (ATMBS), X.25, or a virtual private network. As higher-speed links become available, the cost per bit may decrease, but the absolute cost of links will remain significant. Therefore, there is a need to minimize the net cost per transmitted bit for all connectivity options and link speeds. Minimizing the cost per bit means squeezing the maximum possible utilization out of every link.

Thus, considerable efforts have been spent on designing flow and congestion control processes, bandwidth reservation mechanisms, routing algorithms to manage the network bandwidth and do network capacity planning i.e. optimize the configuration of the established connections (bandwidth allocated, path selected, etc.).

In order to comply with both optimizing network resources utilization and guaranteeing satisfactory SLAs to the network customers, high speed networks generally include monitoring software systems to monitor the status of their nodes and links. These monitoring systems typically rely on counters implemented at switching node level. From a network resources monitoring point of view, the most important counters are those which reflect the behavior of the "bottleneck" resources of the network because they will also reflect the end to end behavior or quality of the service delivered. In high speed networks, the switching nodes are generally oversized in terms of performances compared to the communication links. As a matter of fact, switching nodes are "one time cost" for a network owner while lines cost is recurrent for example in a month period basis in case of leased lines, and is also much higher as previously stated. In order to minimize the overall cost of a network, communication lines are sized in order to handle the traffic requirements but no more, and accordingly their throughput is always less than that of a switching node. Therefore, in a high speed network, communication links generally constitute the "bottleneck resources".

Links utilization data are typically expressed in terms of percentage of bandwidth utilized per unit of time. Links utilization is typically evaluated as follows:

Considering a link 1 whose maximum speed (i.e. bandwidth) is S cells/bytes per second (where S denotes an integer), and assuming that the counters values associated with that link are polled every T time units (where T denotes an integer, e.g., T=15 minutes). Then, the computed utilization estimation U(l) of link 1 associated with each measurement time interval T would be expressed by the following formula:

$$U(1)_T = \frac{N}{S \times T}$$

where N denotes the number of cells/packets received during measurement period T, and where T is expressed in seconds. $U(l)_T$ is expressed in percentage of link utilization.

These link utilization values, which are computed every time interval T (e.g., T=15 minutes) and periodically retrieved, may be processed in a statistics server associated with the network to compute an average link utilization which is the average of link utilization values $U(l)_T$, computed during a day, or over several days or weeks.

Currently, high speed packet switching networks can support hundreds of thousands of connections. Moreover, tens to hundreds of connections may be configured for each newly subscribed user to the network. Very seldom does a customer know the amount of bandwidth required for each of his connections. In addition, network customers usually take some margin in the bandwidth requested for their connections to anticipate an increase of their traffic needs. The foregoing results in that an important difference is observed between the bandwidth reserved (i.e., contracted) by the customers' connections and the actual bandwidth used.

One assumption widely considered by large networks providers is that, due to the important number of customers boarded, the diversity of the locations, and the different types of service requested, there is a very low probability that a high number of connections will be active at the same time.

Therefore, in this context, in order to maximize the network resources utilization, network providers typically practice what is commonly known as "overbooking" or "oversubscription" of their network links. That is, taking advantage of the statistical multiplexing of connections over the links, they allow more connections to be established on a link than the link may theoretically accept with regard to its total bandwidth capacity.

However, the link oversubscription technique suffers from the shortcomings that if a certain number of the customers boarded on the oversubscribed link increase significantly their traffic and/or a certain number of customers' connections are active at the same time, and these numbers exceed the predicted values, then an unpredictable link congestion may occur. Such a congestion would induce a random discarding of packets in excess over the link, as all connections' traffic is categorized non-excess (green) traffic as it stays within the reserved bandwidth.

This random discarding of packets may affect one connection more than another, depending on the time at which the congestion arises, and this goes against the fairness principle which should be applied to the different customers. Besides, in such an oversubscription situation, there is no minimal bandwidth guaranteed per connection.

Therefore, there is a need for a connection bandwidth management technique that would permit at least the same number of connections to be boarded on a given link than when using the typical oversubscription technique, while solving its shortcomings. In particular, such technique should provide a better control of the network behavior in case of a congestion, and guarantee a minimum bandwidth available to each connection boarded on the link.

SUMMARY OF THE INVENTION

A main object of the invention is therefore to provide a connection bandwidth management process and system which rely on an efficient monitoring of the network resources occupancy to re-compute the bandwidth allocated to connections boarded on a given link so that the overall bandwidth capacity of the link is not exceeded, while solving the shortcomings of the conventional oversubscription technique.

In brief, in accordance with the appended set of claims, these objects are achieved by providing a connection bandwidth management process and system for use in a high speed packet switching network.

The network comprises a plurality of switching nodes interconnected through a plurality of communication links. Each of the switching nodes comprises means for switching packets from at least one input link to at least one output link. Each of the output links are coupled to at least one buffer in the switching node for queuing packets before they are transmitted over the output link. Each of the communication links supports the traffic of a plurality of user connections statistically multiplexed over the link. Each user connection is allocated an initial agreed-upon bandwidth through the network, with each of the communication links being possibly oversubscribed.

The connection bandwidth management process according to the invention comprises the steps of:

Link monitoring data on the communication links are periodically received in a network monitoring center, and stored in a computer memory in the network monitoring center. Then, one monitored link is selected and the corresponding link monitoring data are retrieved from the computer memory. The link monitored data retrieved for the selected link is analyzed, and it is determined whether the selected link is oversubscribed or not.

If it is determined that the selected link is oversubscribed and that the link monitoring data for the selected link satisfies at least one predetermined condition the bandwidth initially allocated to each of the connections boarded on the selected link is reallocated, such that, the sum of the reallocated bandwidth of the connections boarded on the selected link is less or equal to the total bandwidth capacity of the selected link. The process recycles until all the monitored links have been selected.

BRIEF DESCRIPTION OF THE DRAWINGS

In the detailed description to follow, reference will be made to the accompanying drawings where like reference numerals are used to identify like parts in the various views and in which:

FIGS. 7A–7B illustrate the contents of a Connection Table (FIG. 7A) and of a Link Table (FIG. 7B) in accordance with the invention;

DETAILED DESCRIPTION OF THE PREFERRED EMBODIMENT

Figure 1:
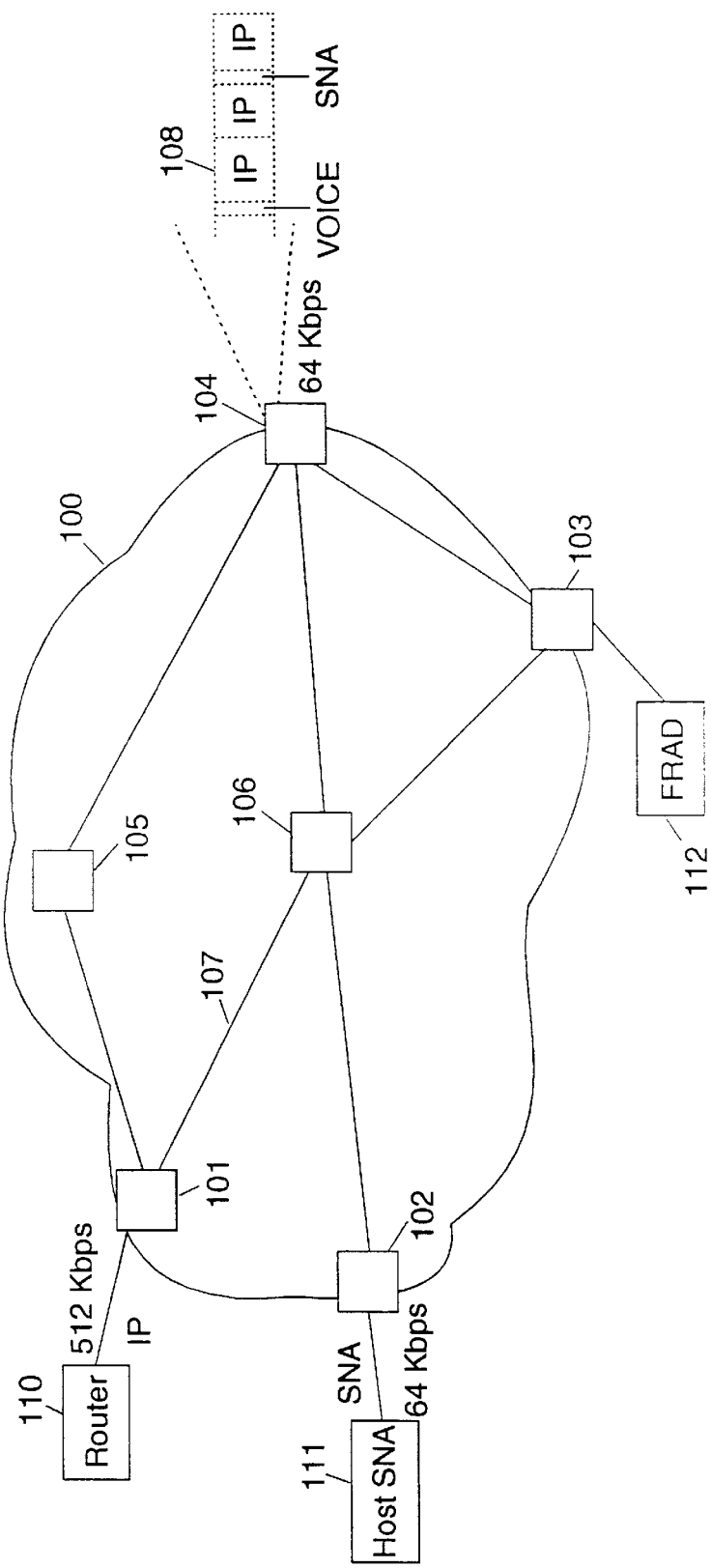
FIG. 1 is a schematic diagram of a typical high speed packet/cell switching network supporting different types of applications.

In the detailed description to follow, the term "packet" refers to either a cell i.e., a small fixed-size packet such as in ATM (asynchronous transfer mode) networks, or a variable size packet such as in IP or Frame Relay networks.

According to the preferred embodiment of the invention, the network comprises a plurality of switching nodes interconnected through a plurality of communication links. Each of the switching nodes comprises means for switching packets from at least one input link to at least one output link. Each of the output links are coupled to at least one buffer in the switching node for queuing packets before they are transmitted over the output link. Each of the communication links supports the traffic of a plurality of user connections statistically multiplexed over the link. Each user connection is allocated an initial agreed-upon bandwidth through the network, with each of the communication links being possibly oversubscribed.

The connection bandwidth management process according to the invention comprises the steps of:

Link monitoring data on the communication links are periodically received in a network monitoring center, and stored in a computer memory in the network monitoring center. Then, one monitored link is selected and the corresponding link monitoring data are retrieved from the computer memory. The link monitored data retrieved for the selected link is analyzed, and it is determined whether the selected link is oversubscribed or not.

If it is determined that the selected link is oversubscribed and that the link monitoring data for the selected link satisfies at least one predetermined condition the bandwidth initially allocated to each of the connections boarded on the selected link is reallocated, such that, the sum of the reallocated bandwidth of the connections boarded on the selected link is less or equal to the total bandwidth capacity of the selected link.

The process recycles until all the monitored links have been selected.

More specifically, the linkmonitoring data received for each monitored link includes a time distribution of the occupancy of the buffer(s) associated to the link, which is measured during a predetermined monitoring time period. The distribution of buffer occupancy is obtained as follows:

First, a plurality N, with N being an integer, of buffer occupancy thresholds T(1) to T(N) are defined, each of said thresholds being indicative of a ratio of the total occupancy of the buffer (340).

Then a plurality N of buffer states ST(1) to ST(N) are defined, each of said states being indicative of the amount of packets stored in the buffer at a given instant in relation to said thresholds T(1) to T(N).

Finally, a plurality N of counters, PT(1) to PT(N), are defined, each of which, PT.(i) with i being an integer comprised between 1 and N, being incremented when the buffer state is determined to be at any of the states ST(i) to ST (N) whereby the measurement of the time distribution of the occupancy of said at least one buffer during a predetermined monitoring time period is achieved by obtaining a set of N values PT(1) to PT(N). These values respectively indicate the percentage of packets that have arrived during said monitoring period while the amount of packets stored in the buffer at the packet arrival instant was equal or greater than thresholds T(1) to T(N).

Therefore, by relying on a close monitoring, at switching node level, of the occupancy state of buffers which accordingly reflects the character bursty or non-bursty of the traffic boarded over the network links, reallocation of the bandwidth of a link connections will be subject to some predetermined conditions on the character bursty or non-bursty of the traffic flowing over the link. "Bursty," as used herein, refers to variable bit rate traffic where the time between data transmission is not always the same.

In a preferred embodiment, the high speed packet switching network is a Frame Relay network, and a connection bandwidth is reallocated by re-computing the following connection bandwidth parameters:

The committed information rate (CIR), the committed burst size (Bc), and the excess burst size (Be).

Furthermore these connection bandwidth parameters are re-computed in such a way that the same amount of traffic is accepted through the network for the connection after its committed information rate (CIR) has been re-computed.

The new CIR allocated per connection is a guaranteed minimum bandwidth available for each connection user, as the sum of the new CIRs for all the connections of a given link is less or equal to the total bandwidth capacity of the link. This also induces fairness between connections in case of packets discarding due to a congestion.

Referring to FIG. 1 there is shown a typical high speed packet/cell switching network wherein connected user applications generate different types of traffic over the network. Network 100 comprises four access switching nodes 101 to 104, and two internal switching nodes 105, 106. Network nodes are interconnected by network links e.g. 107, also referred to as trunks. A router 110 transmits LAN (local area network) batch traffic in IP (Internet Protocol) format at a rate of 512 Kbps (thousands bits per second) over the network, via access node 101. A host computer 111 sends SNA (Systems Network Architecture) traffic at a rate of 64 Kbps to network access node 102. Attached to access node 103 is a Frame Relay Access Device (FRAD) 112 for transmitting voice or video data over the network. With such different applications sending traffic over the network, it is then usual in such network that a switching node transmits data from connections having different traffic profiles.

In FIG. 1, access node 104 outputs data over the same external 64 Kbps transmission line, from connections originating from router 110 (IP data), from Host computer 111 (SNA data), and FRAD 112 (voice data). Thus, the difficulty for such network is to provide each connection with the pre-specified quality of service (QOS). Indeed, some connections are very delay-sensitive as voice or video; other are not sensitive to delays but require a very low packet/cell loss in order to behave correctly, with limited retries.

Figure 2:
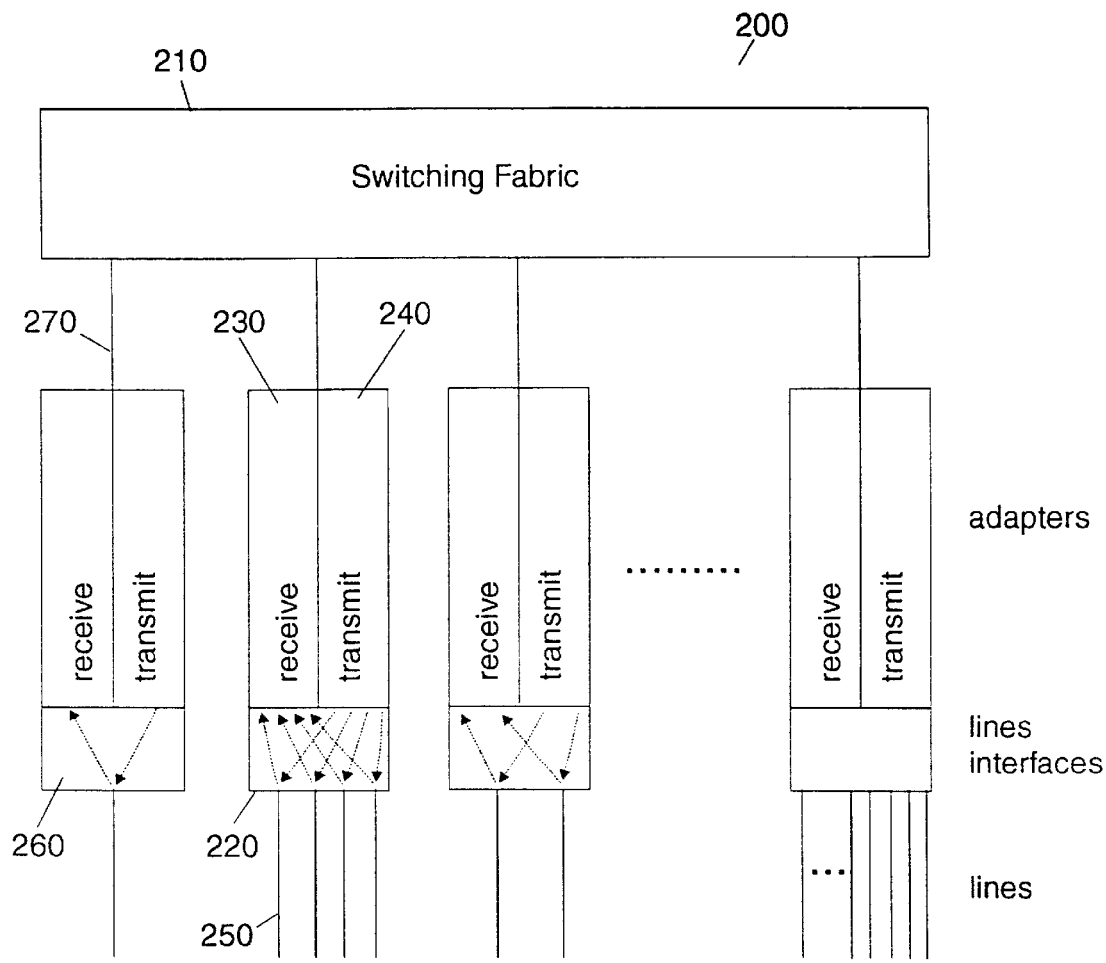
FIG. 2 is a schematic diagram of a high-level view of the internal structure of a typical switching node of the network of FIG. 1.

Referring now to FIG. 2, there is shown a switching node which can be either an access node or an internal node of the network. Communication to the node is accomplished by means of adapters components 220 which connect communication lines 250. Switching fabric 210 connects the various adapters at very high speed. Each adapter connects on one side to external lines via line interface couplers (LICs) 260 and on the other side to one port (270) of the cell/packet switch 210. Packets are received over the external lines 250, either a trunk i.e. an internal link or a port i.e. a network access link. Each of these packets is associated with one network connection which is either starting, transiting or terminating in this node.

Accordingly, adapters can be of two different types, that is, access adapters or transit adapters. Access adapters establish data communication from outside to inside the network, i.e., from network attached data terminal equipment (DTE) to network access nodes. Transit adapters, in the other hand, ensure data transmission between nodes inside the network. Each adapter being access or transit adapter includes two parts: a receive part 230 and a transmit part 240. Receive part 230 receives data flow entering the node while transmit part 240 outputs data flow from the node towards another node (the next node of the path) or to a destination DTE, via communications lines 250.

Access adapters also support the task of Call Admission Control (CAC), that is, the process of analyzing the parameters of a new connection in order to decide whether the connection should be accepted or not, in function of the availability of the network's resources. Another important task performed by access adapters in their receive part, is to control the entering flow from a connection and policing the traffic in function of its compliance to the connection agreed-to traffic descriptors. This policing function comprises marking packets, as excess (red packets) or non-excess (green packets), and discarding. In the other hand, transit adapters do not include such marking function, they may only apply a selective packet discarding, and manage entering traffic e.g. by performing routing functions.

Each network node further includes a series of queuing elements for queuing incoming and departing packets. Queuing is preferably implemented at adapter level rather than at switch level because the process speed of the switch itself (switch fabric 210) is generally much higher than the process speed of an adapter. Thus, these queuing elements are essentially located at adapter level, as described hereinafter in connection with FIG. 3.

Figure 3:
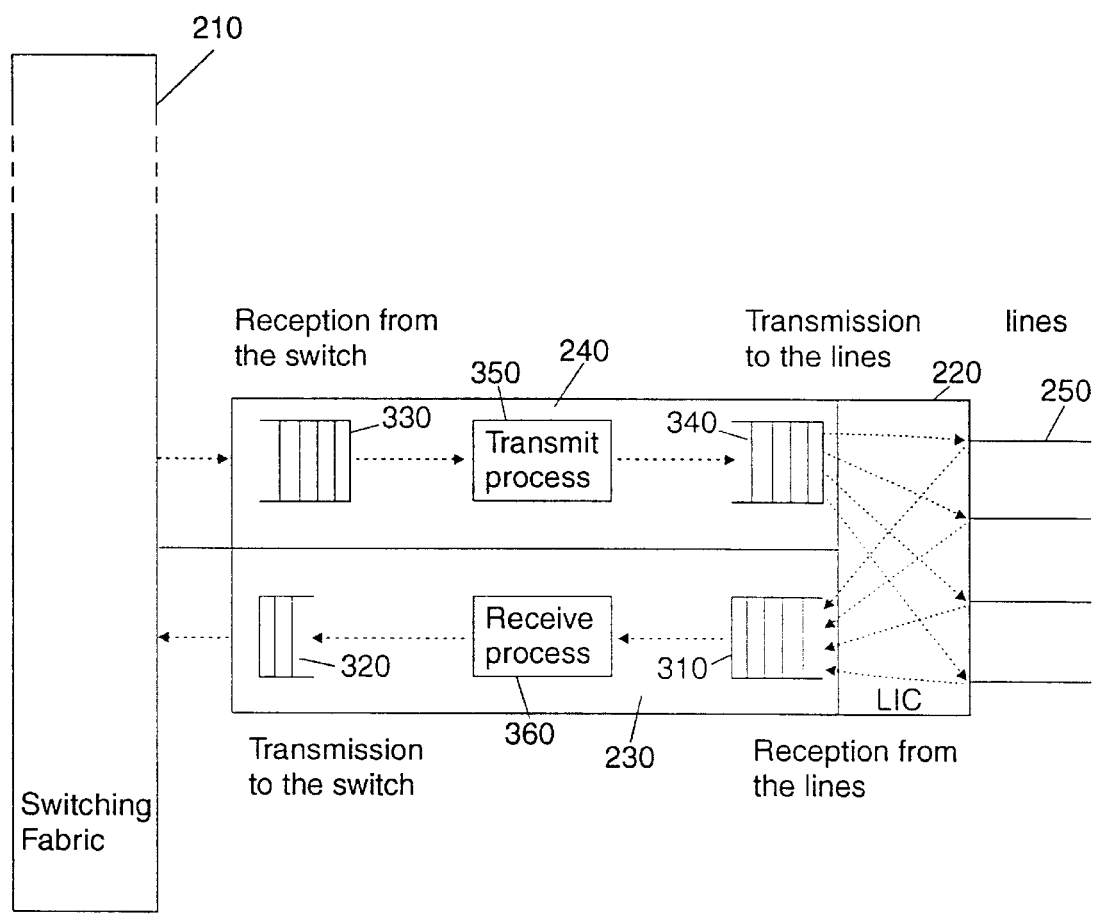
FIG. 3 is a schematic diagram showing the main queuing points of a switching node according to FIG. 2.

Referring to FIG. 3, there is shown the main queuing points of an adapter in a switching node. It is to be noted that the term "queues" stands for what is typically meant under the terms buffers, buffer memories, or queue memories; and the expression "queuing points" stands for specific locations in an adapter where such queues/buffers are implemented.

In adapter 220, four queuing points can be identified, two (330, 340) are located at the transmit part 240 of the adapter, and two others (310, 320) are located at the receive part 230 of the adapter. On adapter receive part 230, once a packet has been received from one of the output lines 250, a receive process 360 is performed. Such a receive process 360 includes connection policing, routing, statistics updates, CRC (Cyclic Redundancy Checksum) checking.

Depending on the architecture of the adapter, the receive process is implemented by means of a specific hardware logic, or through a processor enabled software. The software solution provides more flexibility, but it is generally less efficient in terms of performance (i.e., number of packets processed per time unit) than the specific hardware solution, and consequently a queue 310 may be implemented for queuing incoming packets arriving faster than being processed by receive process element 360. Generally this queuing is limited to compensate for potential bursts of packets. A second queue 320 of adapter receive part 230 may be implemented to compensate for potential congestion of switch 210, but this queuing is negligible as switches are generally designed to operate faster than adapters.

Now regarding the adapter transmit side, a packet that passes from switch 210 to adapter transmit part 240, is firstly queued in switch output queue 330 before it is processed in transmit process element 350. Transmit process element 350 determines the destination output line (250) to transmit packets over. Queue 330 is thus intended to compensate for a lower processing rate of transmit process 350 compared to the arrival rate of incoming switched packets, depending on the implementation type (software/hardware) of the adapter. Generally, when the implementation is software, the adapter processor running the code is designed to sustain a predetermined transmit packet rate larger than the corresponding line speed, and queuing of packets in queue 330 is limited to compensate for potential bursts of packets. Before they are transmitted over destination output lines, packets are queued in adapter output queuing point 340. As network links are generally designed to sustain the traffic characteristics offered and no more (for cost-effective reasons), when congestion occurs the first resources to be saturated are generally the links.

Consequently, adapter output queues constitute the major queuing element in the switching node to compensate for congestion at link level. In view of the foregoing reason, the implementation of the present invention focuses on adapter output queuing point 340 that is, the switching node output transmission queues. The importance of output queuing point 340 is expressed through the number of different traffic management features proposed at this level by the different network providers. Output queuing point 340 comprises a plurality of queues (i.e. buffer memories) which may achieve per priority queuing, per connection queuing, fairness queuing etc. or a combination thereof.

Figure 4:
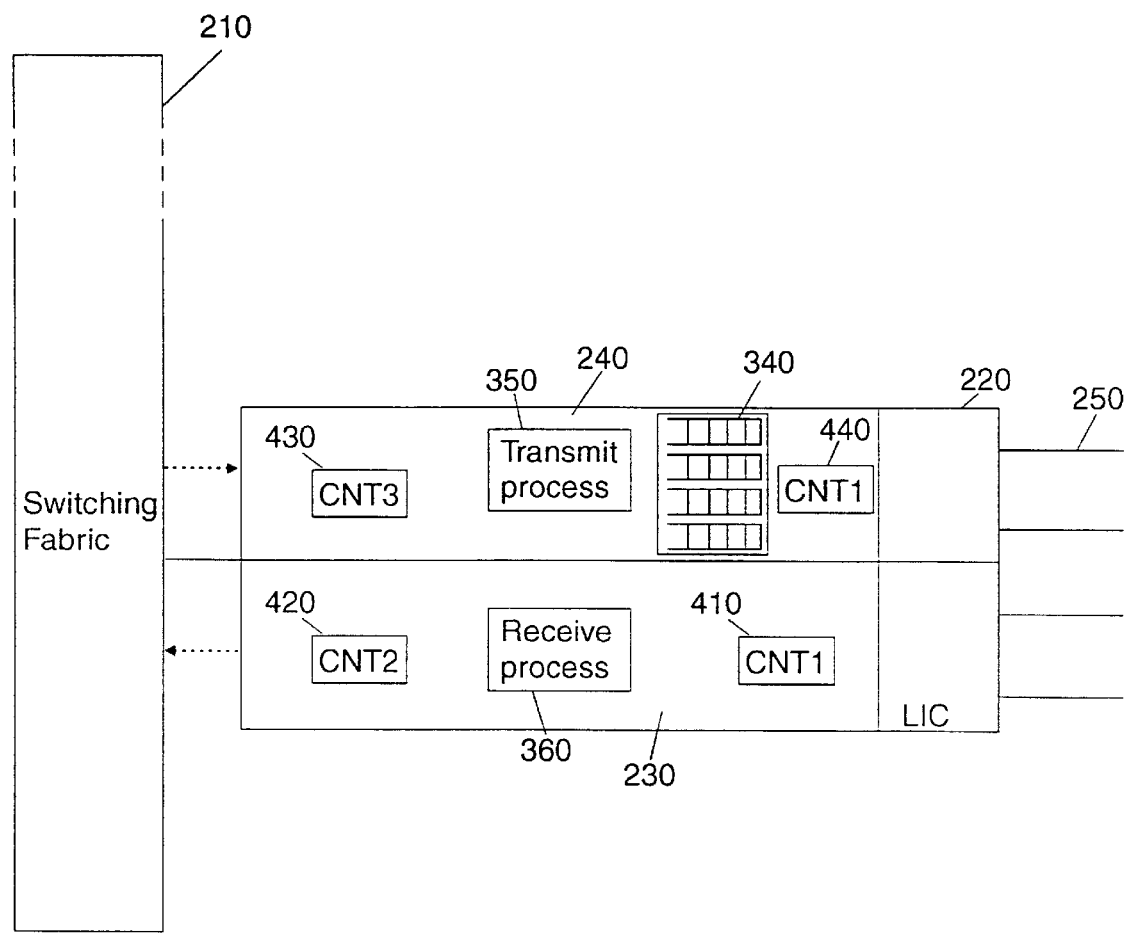
FIG. 4 is a schematic diagram showing the location where packet/cell counters are typically implemented in a switching node according to FIG. 2.

Now referring to FIG. 4, there is shown the location where packet/cell counters are typically implemented in a switching node according to FIG. 2. In the receive part 230 of adapter 220, a first set of counters, receive counters 410 (CNT1), is responsible for counting incoming packets, as well as counting erroneous packets. Still in adapter receive part 230, a second set of counters, accept/discard counters 420 (CNT2), are coupled to the policing process performed within receive process 360. The policing process is the function which verifies the compliance of the traffic supported by a given connection to the contract subscribed (SLA). If the connection traffic is above the agreed-upon traffic then packets may be discarded or tagged. Thus, counters 420 are responsible for counting packets that are tagged or discarded, as well as those that are accepted. Now, in transmit part 240 of adapter 220, counters are also implemented: a third set of counters 430 (CNT3) is responsible for counting packets as soon as they have been received from switching fabric 210, as well as packets discarded due to overflow of the corresponding buffers (queues 330 of FIG. 3). Finally a fourth set of counters 440 (CNT4) is implemented for counting packets when they leave queues 340, just before they are boarded over transmission links 250. All the four sets of counters are implemented globally per adapter, then per port, per class of service, and possibly per connection. As previously stated, from a network resources monitoring point of view, the most important counters are those which reflect the behavior of the "bottleneck" resources of the network because they will also reflect the end to end behavior or quality of the service delivered. These counters are accordingly counters 440 (CNT4). However these counters provide numbers that do not take into account the possible burstiness of the traffic and therefore allow to compute link utilization statistics that lack accuracy.

According to the invention, there is provided a new technique of network resources monitoring based on queues occupancy monitoring rather than merely counting packets that are boarded to the outgoing links of the nodes, as typically performed by counters 440 (CNT4). The principle is to measure the occupancy of each of the "bottleneck" queues, i.e., queues 340 each time a packet is admitted to one of these queues. While this technique will be described hereinafter with reference to one memory queue, it should be understood that each of the memory queues 340 is monitored in the same manner.

Buffer Occupancy Monitoring Principle

The principle of buffer/queue occupancy monitoring relies on defining for each queue 340 a plurality N (N is an integer) of thresholds $T(1)$ to $T(N)$ expressed in terms number of packets or bytes stored in the queue. For ATM networks they would be expressed in number of cells, while for packets of variable size such as for Frame Relay networks, they would be expressed in number of bytes. The total number of cells/bytes stored in the queue at a given instant, is referred herein to as the expression "queue size" and noted "Qsize". Thresholds T(1)–T(N) are chosen so as to correspond to different percentages of occupancy of the queue, function of its total capacity. In relation with these N thresholds, a number N of queue states, ST(1)–ST(N), are defined with regard to the comparison of the queue size with the thresholds T(1)–T(N). Queue states ST(1)–ST(N) are defined as follows:

| | |
|---|---|
| ST(1): | Queue state when T(1) <= Qsize < T(2) ; |
| ... | ... |
| ST(p): | Queue state when T(p-1) <= Qsize < T(p) ; |
| ... | ... |
| ST(N-1): | Queue state when T(N-1) <= Qsize < T(N) ; |
| ST(N): | Queue state when Qsize >= T(N) . | where "<=" stands for "less or equal to", and ">=" stands for "greater or equal to".

Further, a number N of counters, PT(1)–PT(N), are implemented. Each counter PT(i) (with i comprised between 1 and N) is incremented when the queue state (Queue_State) is found to be at any of the states ST(i) to ST(N).

In the preferred embodiment of the invention, four (N=4) thresholds are defined: T(1), T(2), T(3), T(4) which correspond to 5%, 20%, 40% and 70% of the total queue capacity. Associated to these thresholds, queue states ST(1) to ST(4) are thus defined as follows:

ST(1): Queue state when T(1) <=Qsize<T(2);
ST(2): Queue state when T(2) <=Qsize<T(3);
ST(3): Queue state when T(3) <=Qsize<T(4);
ST(4): Queue state when Qsize >=T(4).

Four counters PT(1)–PT(4) are implemented. For example, as explained above, counter PT(2) would be incremented if queue state is determined to be any of the states ST(2), ST(3), ST(4).

The overall process of queue occupancy monitoring will now be described in connection with FIG. 5. In the preferred embodiment of the invention, this process is implemented in the form of a computer program within the transmit process 240 (FIG. 3) in the adapter transmit part 220.

Figure 5:
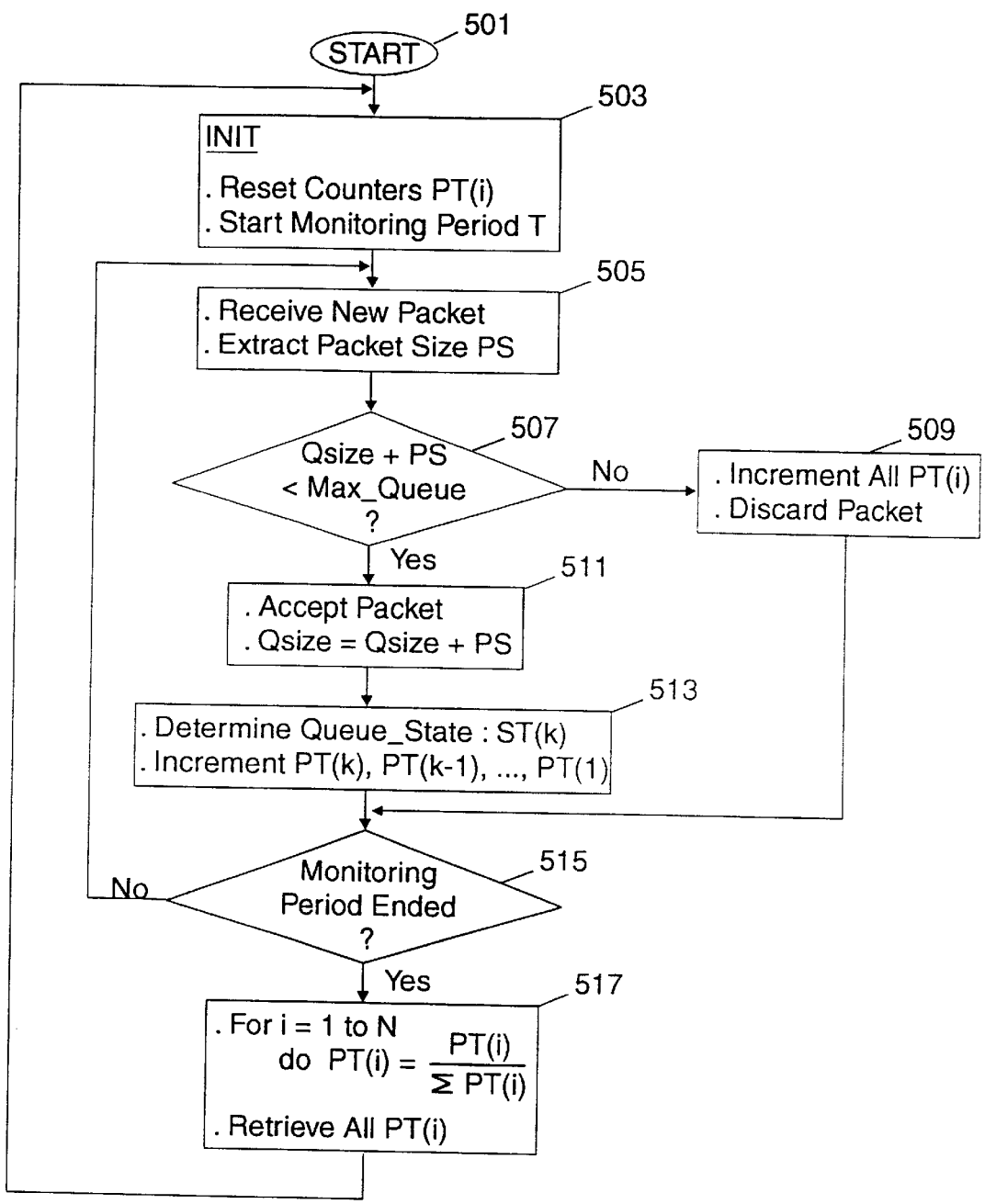
FIG. 5 is a flow chart illustrating a buffer occupancy monitoring process according to the invention.

In FIG. 5, the process of queue occupancy monitoring according to the invention starts at start box 501. Then, at box 503, an INIT step is performed where all the N counters PT(i) with i comprised between 1 to N are initialized to zero. Still in box 503, a new monitoring time interval (period) T is started. In next box 505, when a new packet is received from the switching fabric, its size PS is extracted from its header. It should be noted that in case of ATM cells, the cell size is fixed and the queues sizes are expressed in number of cells. Then, decision box 507 is entered to check if the queue can accept this packet. That is, current queue size (number of cells/bytes currently stored in the queue) increased with incoming packet size PS should be less than the maximum capacity, Max_Queue, of the queue. If not (NO) box 509 is entered in which all counters PT(i) with i from 1 to N are incremented, and finally the new packet is discarded as it cannot be stored in the queue. The process then continues with decision box 515. Conversely, if the new packet can be enqueued (YES), box 511 is entered in which the new packet is accepted in the queue, and accordingly current queue size (Qsize) is overridden with new packet size (PS). Then, box 513 is entered to determine the state of the queue (Queue_State) with regard to the queue states ST(1)–ST(N) defined above. When the queue state, ST(k) (with k being an integer comprised between 1 and N) is determined, then counters PT(1) to PT(k) are incremented. The process continues with decision box 515, where it is tested whether monitoring period T is completed or not. If not (NO), the process recycles to box 505 to receive a new packet. If so (YES), the process ends with box 517 in which all counters values PT(1) to PT(N) are divided by:

$\Sigma PT(i)$

With $\Sigma PT(i)=PT(1)+PT(2)+ \ldots +PT(N)$

That way, final values PT(i) obtained express each the percentage of packets that have arrived during monitoring period T while the queue was in any of the states ST(i) to ST(N). In other words: each value PT(1) to PT(N) indicates respectively the percentage of packets that have arrived during monitoring period T while the queue size (Qsize) was equal or greater than respectively threshold T(1) to T(N).

Finally in box 517, final values PT(1) to PT(N) are retrieved by the General Purpose Processor of the adapter, so that these values are available to be polled by the bulk statistics server. After box 517 is complete, the process recycles at init box 503 to initialize a new monitoring period. It should be noted that period T should be chosen such as to avoid counters overflow. In the preferred embodiment of the invention, period T is chosen to be 15 minutes.

In parallel with the foregoing process described in connection with FIG. 5, each time a packet has been successfully transmitted from the queue over an outgoing link (250), the queue size (Qsize) is accordingly decremented by the size of the packet.

Thus, after each monitoring period T and for each queue (340), it is obtained an evaluation of the time distribution of the queue occupancy with reference to the thresholds T(1)–T(N) chosen during the monitoring period (T) considered. This queue occupancy evaluation is available through a set of N values: PT(1) to PT(N). Each value PT(i) indicates the percentage of packets that have arrived during monitoring period T while the queue size (Qsize) was equal or greater than threshold T(i), with T(i) expressed in percentage of the total queue capacity. It is therefore clear that such evaluation of the time distribution of the queue occupancy takes into account the character bursty or non bursty of the traffic flowing over the link monitored while it is not reflected in the prior art "average link utilization" technique.

Figure 6:
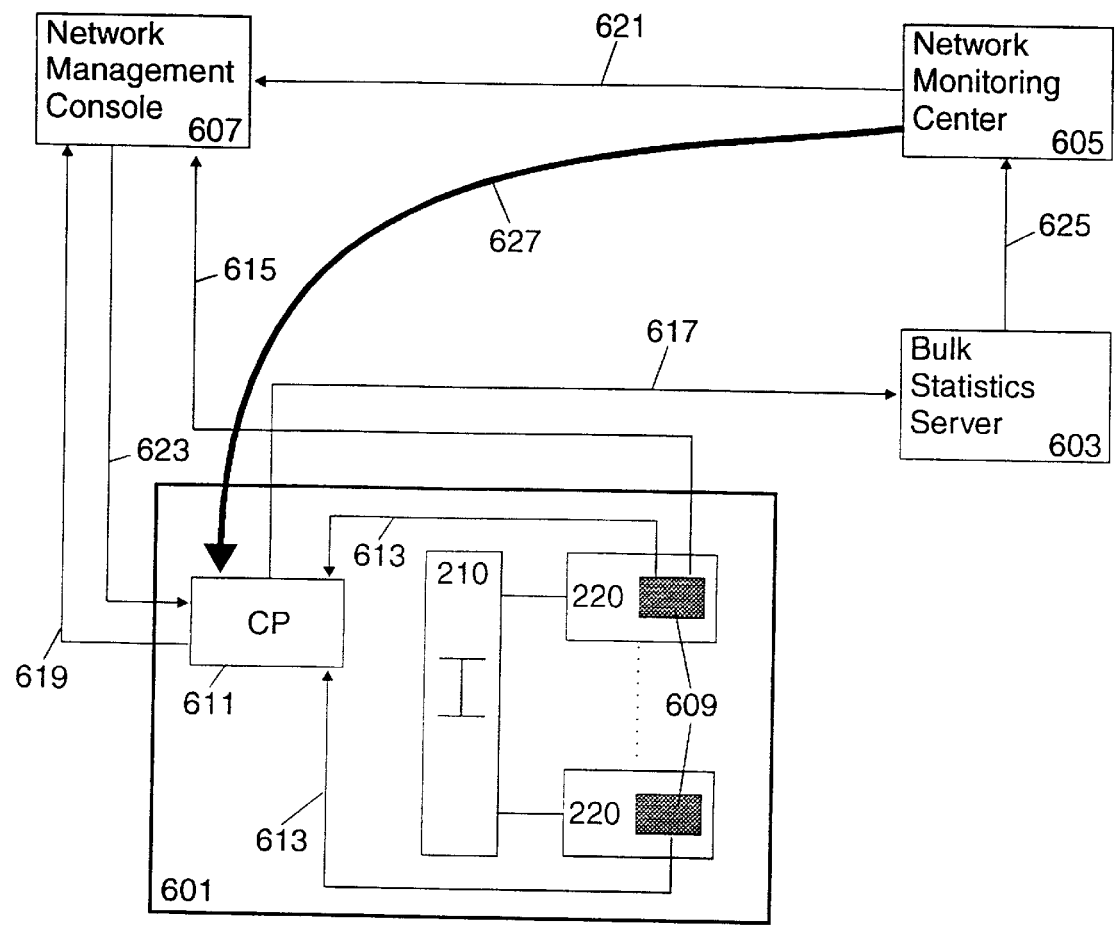
FIG. 6 is a schematic block diagram illustrating a general network management architecture of a high speed packet switching network.

Now with reference to FIG. 6, there is shown a schematic block diagram illustrating a general network management architecture in which counters values at node level are retrieved and used to build network statistics and do capacity planning.

In FIG. 6, only one network node 601 is represented for simplicity of illustration. In node 601 a switching fabric 210 connects a plurality of adapters 220. Still in node 601, a Control Point processor (CP) 611 provides the network control functions. Adapters 220 include memory locations 609 where adapter counters values are stored. As illustrating by arrows 613, Control Point processor 611 centralizes periodically the different counters values measured during the measurement periods. These data are periodically sent to the bulk statistics server 603 as shown by arrow 617 which collects in background all the statistics from all the network nodes, usually at night. Statistics server 603 sends periodically or on demand the statistics files containing data for all the network resources to a network monitoring center 605, as shown by arrow 625. In the network monitoring center 605, human operators use these files to monitor the network resources and take the appropriate network monitoring actions, e.g., capacity planning actions. Network monitoring actions are performed through a network management console 607 typically a personal computer or workstation as illustrated by arrow 621. The network management console 607 transmits the network monitoring commands to the Control Point processor 611 of the network nodes concerned, as illustrated by arrow 623. Lastly, the counters values stored in memory locations 609 of node adapters 220 may also be accessed directly in real time by a human operator through network management console 607.

In the network management context described above in connection with FIG. 6, there will now be described how the general process of network resources (links and nodes) monitoring may be advantageously used in conjunction with the new connection bandwidth management technique of the present invention in order to allow a reallocation (herein referred to as "right sizing" or "re-sizing") of the bandwidth reserved (i.e. agreed-upon through the SLAs) of the connections boarded on a given link of the network. This process is referred hereinafter as "Connection Bandwidth Right Sizing" (CBRS) process.

The right sizing of the bandwidth reserved for the connections is justified, as previously stated, by the observation that network customers usually take some margin in the bandwidth requested for their connections, e.g., to anticipate an increase of their traffic, or because they cannot evaluate accurately their current and future needs. The foregoing results in that there is most of the time an important difference between the bandwidth reserved (CIR in Frame Relay) by the users for their connections and the actual bandwidth used.

These "right sizing" actions are taken responsive to the analysis of the resource monitoring information, i.e., the average link utilization and/or of the link buffer occupancy statistics, and are triggered in the network monitoring center 605 of FIG. 6. The connections "right sizing" actions are transmitted through the network to the Control Point processors of the ingress access nodes (e.g., nodes 101,102 of FIG. 1) of the network where the concerned connections have been originally set out.

Referring back to FIG. 6, the CBRS process is illustrated by additional arrow 627 extending from network monitoring center 605 to Control Point 611 of node 601 which, in this case, represents a network ingress access node. Arrow 627 corresponds to the modifications brought to the connection parameters in order to re-size its allocated bandwidth, at its origin node. This is performed by means of dedicated commands automatically sent through the network by the computer system in charge of the CBRS process, from the monitoring center (605) to the origin switching node (601).

Following is a description of a preferred embodiment of the Connections Bandwidth Right Sizing (CBRS) process according to the invention. It should be understood that, while the network considered is based on Frame Relay technology, the CBRS process of the invention could also be implemented in another high speed packet/cell switching technology such as the ATM technology for example.

In a Frame Relay packet switching network, the maximum number of bits per seconds which an end station can transmit into the network is bounded by the access rate of the user-network interface. The access rate is limited by the line speed of the user-network connection and established by subscription.

The maximum committed amount of data which a user may offer to the network is defined as "committed burst size" (Bc). Bc is a measure for the volume of data for which the network will guarantee message delivery under normal conditions. It is measured during the committed rate measurement interval (Tc).

End stations are allowed to transmit data in excess of the committed burst size. The excess burst size (Be) has been defined as the allowed amount of data by which a user can exceed Bc during the committed measurement rate interval Tc. If spare capacity exists the network will forward the data to its destination. The network however is free to mark the data as discard eligible (DE).

The committed information rate (CIR) has been defined as the allowed amount of data which the network is committed to transfer under normal conditions. The rate is averaged over an increment of time Tc. The CIR is also referred to as minimum acceptable throughput. The Bc and Be are expressed in bits, Tc in seconds, the access rate and CIR in bits per second. Bc , Be , Tc , CIR are defined per DLCI (Data link Connection Identifier), the access rate is valid for per user-network interface. For permanent virtual circuits Bc (incoming and outgoing), Be (incoming and outgoing) and CIR (incoming and outgoing) are defined at subscription time. Tc is calculated as follows:

$$Tc = \frac{Bc}{CIR} \quad (1)$$

Each time, a user requests a new connection to be established, the network operator, through its operation/design teams, checks whether the new connection defined by its access rate, CIR and Bc requested by the user can be accepted by the network (in terms of resources availability). If not, the new connection request is rejected. If so, a corresponding amount of bandwidth or network capacity is reserved to that connection.

Then, each reserved bandwidth connection provides a set of traffic descriptors to the network in the form of an entry in a dedicated table, herein referred to as "Connection Table" stored in a database memory in all the network nodes. In Frame Relay, the Connection Table basically contains an identifier of each connection (DLCI), its origin and destination ports, and its associated CIR, Bc, Be, Access Rate.

Another table, herein referred to as "Link Table." is associated to the network links. The Link Table, which is also stored in the database memory of the nodes, contains link descriptors containing information such as the total link capacity (bandwidth), the bandwidth reserved per class of service, the link availability, or the link propagation delay. The Connection Table and the Link Table will be further described in connection with FIGS. 7A–7B.

At network ingress access node level, the task of Call Admission Control (CAC) is performed. The CAC task is basically the process of analyzing the parameters of a new connection (in the Connection Table), in order to decide whether the connection should be accepted or not in function of the availability of the network's resources.

Still at ingress access node level there is performed the process of user traffic policing. Traffic policing is a process of adjusting the incoming traffic to enforce conformance with the agreed-to mean and burst; these actions will only impair non-conforming connections. Three techniques can be used:

Delay

Slowing down non-real-time packets such that they are submitted to the network over a longer time period (in other words, in less of a burst). This is also known as smoothing the traffic. Smoothing the traffic better utilizes overall network bandwidth; it is done only within the agreed-to quality of service.

Tagging

Marking packets as Excess when they arrive above the committed burst rate. Typically, when bursts of packets are larger than Bc but lower than Bc+Be, packets above Bc are tagged, i.e., Discard Eligibility (DE) bit on.
Note: Packets marked excess are also called red packets, while non-excess packets are called green.

Discarding

Discarding packets that arrive at a rate larger than the committed rate plus the extra rate being allowed as Excess. Typically, when bursts of packets larger than Bc+Be are sent at the Access Rate, packets above Bc+Be are discarded.

Tagging and discarding are typically performed by the well-known leaky bucket algorithm.
Note: A similar process is done in ATM networks with the corresponding parameters: PCR (Peak Cell Rate), SCR (Sustainable Cell Rate), and MBS (Mean Burst Size) instead of respectively Access Rate, CIR, and Bc.

As a consequence of the policing process which operates at the entrance of the network, if for a given trunk, the sum of the CIRs is less or equal to the trunk capacity, that is, no oversubscription of the trunk is practiced, the risk of network congestion is very low. Actually, network congestion states may still occur because some excess traffic (Be) is accepted by the network on top of the committed/reserved traffic. However, this accepted excess traffic is tagged at the entrance of the network (Discard Eligibility on), which allows this traffic to be discarded first in case of congestion, and guarantee that the committed part of the connections' traffic will be transmitted successfully.

Conversely, if the sum of the CIRs is greater than the trunk capacity, then the trunk is oversubscribed that is, the network is relying on statistical multiplexing to hope that every user does not ask for his CIR simultaneously. Accordingly, if a congestion appears due to a high proportion of users connected simultaneously, as the traffic over each connection is non-excess traffic (DE off), then packets would be discarded randomly depending on their order of arrival in the queues of the network nodes. Thus, in this congestion case the minimum guaranteed traffic (CIR) per user would not be respected.

The Connection Bandwidth Right Sizing (CBRS) process of the invention allows the same number of users being subscribed at the same time as when oversubscription is practiced, while minimizing the risk of congestion and still guaranteeing a minimum bandwidth to transfer traffic.

With reference to FIGS. 7A–7B, there is illustrated the contents of the Connection Table (FIG. 7A) and of the Link Table (FIG. 7B) in accordance with the invention. In FIG. 7A, Connection Table 700 is shown with various columns that correspond each to a particular type of connection parameter. Fields in column 702 correspond to the connections' identifier (DLCI in Frame Relay). In table 700, for argument's sake, records for two connections having respectively identifier C1 and C2 are shown. Fields in column 704 contain the original CIR (CIR) of the connections, that is, the CIR agreed-upon at subscription time. In table 700, CIR is expressed in kilobits per second (Kbps). Fields in columns 706 and 708 contain respectively the committed burst size (Bc) and the excess burst size (Be) of the connections. Both Bc and Be are expressed in Kilobits (Kb) in table 700. Fields in column 710 contain the access rate of the connections. The access rate is expressed in kilobits per second (Kbps) in table 700. The foregoing connection parameters (Connection ID, CIR, Bc, Be, and access rate) are typically found in the Connection Table. According to the invention, there are two additional parameters per connection recorded in the Connection Table. These additional parameters are referred to as "CRF" and "NCIR", and correspond to the fields which are contained respectively in columns 712 and 714. CRF parameter stands for "Connection Right Sizing Factor," and NCIR parameter stands for "New CIR." CRF and NCIR are respectively initialized to 1 (one) and to CIR value at connection setup. CRF parameter is indicative as to whether the connection has been already "right sized" or not. These two additional parameters will be described further in connection with FIG. 8.

Now referring to FIG. 7B, Link Table 720 is shown. As previously stated, Link Table 720 is associated to the network links and provides information relative to all the network links, typically, such as: the total link capacity (bandwidth), the bandwidth reserved per class of service, the link availability, or the link propagation delay. For simplicity of illustration, in FIG. 7B, Link Table 720 is shown including only the parameters that are used by the CBRS process according to the invention. Table 720 includes three columns: first one at 722, contains fields that correspond to the links' identifier. In table 720, for argument's sake, records for one link (L1) is shown. Columns 724 and 726 corresponds to link additional parameters that are used in the Connection Bandwidth Right Sizing process of the invention. First additional parameter "Link Right Sizing Factor" (LRF) corresponds to the fields which are contained in column 724. Second additional parameter "Link Oversubscription Factor" (OVF) corresponds to the fields contained in column 726. OVF parameter is expressed in percentage (%) and represents the ratio of oversubscription of the link.

For example, let's consider an OC3 link which has a service rate of 155 Mbps (megabits per second). If the ratio of oversubscription (OVF) of this OC3 link is 400%, then it means that the sum of the CIRs of the connections boarded over the link is four times its service rate (actual maximum bandwidth available on that link), that is, 620 Mbps. If no oversubscription is applied on that link, then the sum of the CIRs of the connections boarded over the link is less or equal to the link capacity, that is, 155 Mbps. In the latter case OVF is equal to 100%.

The LRF parameter associated to a given link indicates whether or not the CBRS process has been applied to that link. LRF is initialized to OVF/100. After the CBRS process run on that link is complete, the LRF parameter associated to the link in table 720 is set to 1. As shown in table 720, link L1 in the table is oversubscribed with a ratio (OVF) of 400%. However the CBRS process has not been run yet on this link since its LRF parameter is still equal to 4.

Additional link parameters LRF and OVF will be used in conjunction with the connections additional parameters CRF and NCIR in the Connection Bandwidth Right Sizing (CBRS) process of the invention, as will be described hereinafter, in connection with FIG. 8.

Figure 8:
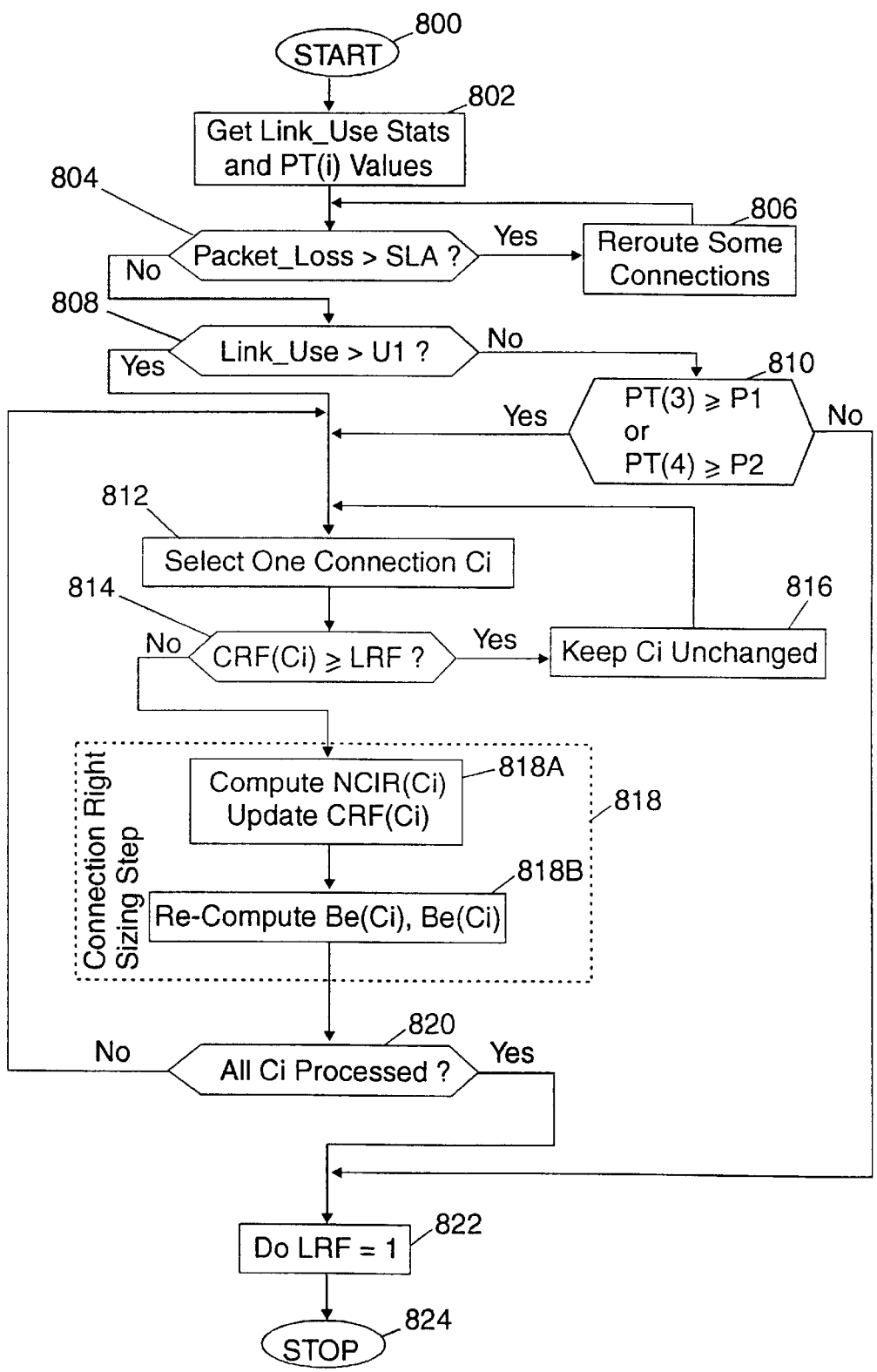
FIG. 8 is a flow chart illustrating the Connection Bandwidth Right Sizing (CBRS) process of the invention.

FIG. 8 is a flowchart illustrating the Connection Bandwidth Right Sizing (CBRS) process of the invention. CBRS process is implemented in the form of computer programs which run in a monitoring-dedicated computer in the network monitoring center (FIG. 6, 605). CBRS process is automatically triggered in the network monitoring center (FIG. 6, 605), upon receiving of the network links monitoring reports which include the average link utilization and/or of the link buffer occupancy statistics. Usually, the monitoring reports are received every night in the network monitoring center, and a typical frequency for running the CBRS process is from one to some days. The CBRS process is a background type process.

It should be noted that while, in the preferred embodiment of the invention, the CBRS process utilizes both the average link utilization statistics and the link buffer occupancy statistics for more efficiency, the CBRS principle could also be implemented with only the average link utilization statistics used.

In FIG. 8, the CBRS process of the invention is initiated, starting at start box 800, whenever the network links monitoring reports are received. At that time, all links of a link list stored in memory will be processed sequentially starting with the first link of the list. Then, box 802 is entered to retrieve the statistics values corresponding to the selected link, from the links monitoring reports which are stored in a computer memory in the network monitoring center. The link associated statistics values include:

the associated daily or weekly average link utilization statistics ("Link_Use");

the associated link buffer occupancy statistics ("PT(i) values"), i.e., the averaged PT(i) values (PT(1) to PT(4) in the preferred embodiment), with each value PT(i) indicating the percentage of packets that have arrived during the long term period considered while the queue size (Qsize) was equal or greater than threshold T(i);

the link packet loss ratio ("Packet_Loss"), i.e. the percentage of packet discarded due to congestion during the long term period considered.

After step at box 802 is complete, decision box 804 is entered where it is determined whether the link packet loss is greater than the SLA (service level agreement) requirements associated with the connections boarded on the link. If the link packet loss (Packet_Loss) is larger than the SLA, it means that the link is already not capable of providing a good level of service with regard to the SLA because it is overloaded. In that case (YES), box 806 is entered to reroute some of the connections which are currently boarded on the link, until the selected link packet loss is less than the maximum packet loss allowed (SLA), as shown by re-entering box 804. Then, if the selected link packet loss is less than the SLA requirements (NO), box 808 is entered to test whether the Link_Use is greater than a first predetermined value U1 which is equal to 80% in the preferred embodiment of the invention. If not (NO), decision box 810 is entered to test buffer occupancy values PT(3) and PT(4). If PT(3) is greater or equal to a first predetermined buffer occupancy value P1, OR if PT(4) is greater or equal to a second predetermined buffer occupancy value P2, it means that:

Either the percentage of packets PT(3) that have arrived during the monitoring time period while the queue occupancy (Qsize) was equal or greater than T(3) is greater or equal to P1 OR the percentage of packets PT(4) that have arrived during the monitoring time period while the queue occupancy (Qsize) was equal or greater than T(4) is greater or equal to P2. In the preferred embodiment of the invention, T(3)=40%, T(4)=70%, P1=60%, P2=10%.

If no t (810, NO), the process aborts as shown by entering terminal box 822, another link can be selected and the CBRS process restarted.

If so (810, YES), box 812 is entered to select a first connection (Ci) boarded on the link, i.e., select its associated ID in Connection Table 700.

Then, decision box 814 is entered to test whether or not the Connection Right Sizing Factor, CRF (Ci), associated to the selected connection Ci, in Connection Table 700, is greater or equal to the Link Right Sizing Factor (LRF) associated to the selected link in Link Table 720.

CRF(Ci) can be determined to be greater or equal to LRF in the following cases:

Connection Ci has been already "re-sized" (CRF (Ci) >1) when the CBRS process was run on another link along the path allocated to that connection through the network.

Connection Ci has not been re-sized yet (CRF (Ci)=1), while current link is not oversubscribed (LRF=1)

If CRF(Ci) is determined to be greater or equal to LRF (814, YES) then selected connection Ci is kept unchanged (NCIR=CIR) as shown by entering box 816. Then, the CBRS process recycles entering box 812 to select another connection boarded on the link.

Conversely, if CRF(Ci) is determined to be less than LRF (814, NO) then box 818 is entered to perform the actual Connection Bandwidth Right Sizing (CBRS) step on the selected connection (Ci). In box 818, box 818A is entered first to perform the first sub-step of the CBRS step, that is, computing a new CIR for connection Ci (NCIR(Ci)), and updating accordingly the connection right sizing factor (CRF(Ci)). The new CIR and the updated CRF are respectively recorded into the fields corresponding to connection Ci, in respectively column 714 and 712 of table 700.

Then, after step in box 818A is complete, box 818B is entered to perform a second sub-step in which parameters Be and Bc associated to the selected connection are re-computed to reflect the new CIR (NCIR). Newly computed Be and Bc of the connection (herein referred to as NBe(Ci) and NBc(Ci)) are recorded into the fields corresponding to connection Ci in respectively column 708 and 706 of Connection Table 700. Details on how CRF, NCIR, NBe and NBc are calculated will be provided further in the description.

When CBRS step at box 818 is complete, decision box 820 is entered where it is determined whether all connections which are presently boarded on the selected link have been processed or not. If not (NO), box 812 is re-entered in order to select another connection to apply the CBRS step (818) on. Conversely, if all the connections boarded on the selected link have been processed (820, YES), then box 822 is entered to set the LRF parameter of the selected link to 1 (one) in Link Table 720.

Finally, terminal box 824 is entered to complete the CBRS process run on the selected link. Another link may now be selected and the CBRS process started on it.

Therefore, after all the network links have been processed by the CBRS process, each one of the connections established through the network is allocated a "re-sized" bandwidth (NCIR) which corresponds to the original bandwidth (CIR) that has been divided by the highest link oversubscription factor (OVF) of all the links along the path selected through the network for that connection.

NCIR and CRF Calculation

Let us consider a given monitored link of the network. As previously stated in connection with FIGS. 7A–7B, each connection Ci is defined through a set of parameters including the committed information rate (CIR), its committed burst size (Bc) and its excess burst size (Be). When the link is passed through the Connection Right Sizing process, if the link is oversubscribed (LRF>1) each of its connections, Ci, is "re-sized" if CRF(Ci) is less than LRF, that is, its CIR is recalculated and is recorded in table 700 in the NCIR (New_CIR) corresponding field. Accordingly, the CRF parameter of the connection is updated to indicate the ratio of re-sizing of the connection.

According to the invention, NCIR for connection Ci is calculated according to the following formula:

$$NCIR(Ci) = \frac{CIR(Ci)}{LRF} \quad (2)$$

Where LRF is the "Link Right Sizing Factor" (LRF) of the link.

And the CRF parameter of the connection (CRF(Ci)), which was initialized to 1 is set to the link LRF value:

$$CRF(Ci)=LRF$$

For example, in Link Table 720 of FIG. 7B, link L1 is oversubscribed at 400% (oversubscription factor, OVF= 400), its right sizing factor LRF has been initialized to 4 (OVF/100). Now suppose that connection C1 in Connection Table 700 is one of the connections that are boarded over link Li. As shown in column 704 of table 700, connection C1 has an original CIR of 200 Kbps, while its re-sized CIR (NCIR) in column 714 is equal to 50 Kbps, that is:

$$\frac{CIR(C1)}{LRF(L1)}$$

And its CRF is equal to 4, that is:
ti CRF(*C1*)=LRF(*L1*)

Now having regard to connection C2 in table 700, one can see that its new CIR (NCIR) in column 714 is equal to its original CIR in column 704, i.e., 64 Kbps. This means that connection C2, is either boarded over a path whose links are not oversubscribed (OVF=100%), or none of the links of the path have been passed through the CBRS process yet.

Be and Bc Recalculation

As previously stated after new CIR (NCIR) is computed for a given connection (box 818A, FIG. 8), the Be and Bc parameters associated to the selected connection are re-computed to reflect the new CIR (NCIR) (box 818B).

The committed burst size (Bc) and the excess burst size (Be) parameters of the connection must be re-computed to induce the same amount of traffic boarded over the link before and after the link is passed through the CBRS process. In Frame Relay, the total amount of traffic accepted per connection Ci is typically:

$$CIR\left(1 + \frac{Be}{Bc}\right) \quad (3)$$

Consequently, in order to keep the same amount of traffic accepted for the connection after its CIR has been re-sized, Be and Bc must be re-evaluated such that the following equation is verified:

$$CIR\left(1 + \frac{Be}{Bc}\right) = NCIR\left(1 + \frac{NBe}{NBc}\right) \text{ with} \quad (4)$$

$$NCIR = \frac{CIR}{LRF} \quad (2')$$

Besides, according to equation (1) above we have:

$$Tc = \frac{Bc}{CIR} = \frac{NBc}{NCIR} \quad (1')$$

with Tc being the committed measurement rate interval.
From the foregoing equations (1'), (2') and (4'), new Be and Bc (NBe and NBc) can be expressed as follows:

$$NBc = \frac{Bc}{LRF} \text{ and } NBe = (Bc - NBc) + Be$$

While the invention has been described in terms of a preferred embodiment, those skilled in the art will recognize that the invention can be practiced with variations and modifications. Therefore, it is intended that the appended claims shall be construed to include both preferred embodiment and all variations and modifications thereof that fall within the scope of the invention.

What is claimed is:

1. A connection bandwidth management process for use in a high speed packet switching network having a plurality of switching nodes interconnected through a plurality of communication links, each of the switching nodes having means for switching packets from at least one input link to at least one output link, each of the output links being coupled to at least one buffer in the switching node for queuing packets before they are transmitted over the output link, each of the communication links supporting the traffic of a plurality of user connections statistically multiplexed over the link, each user connection being allocated an initial agreed-upon bandwidth through the network, with each of the communication links being possible oversubscribed, the connection bandwidth management process comprising the steps of:

periodically receiving, in a network monitoring center, link monitoring data on the communication links, and storing the link monitoring data in a computer memory in the network monitoring center;

selecting one monitored link and retrieving the corresponding link monitoring data from the computer memory;

analyzing the link monitoring data for the selected link wherein the link monitoring data includes, for each of the monitored links, a time distribution of the occupancy of the buffer measured during a predetermined monitoring time period;

determining whether the selected link is oversubscribed or not;

upon determining that the selected link is oversubscribed that the link monitoring data for the selected link satisfies at least one predetermined condition, reallocating the bandwidth initially allocated to each of the connections boarded on the selected link, such that the sum of the reallocated bandwidth of the connections boarded on the selected link is less or equal to the total bandwidth capacity of the selected link; and obtaining the time distribution of the occupancy of the buffer by:
    defining a plurality N, with N being an integer, of buffer occupancy thresholds T(1) to T(N), each of the thresholds being indicative of a ratio of the total occupancy of the buffer;
    defining a plurality N of buffer states ST(1) to ST(N), each of the states being indicative of the amount of packets stored in the buffer at a given instant in relation to the thresholds T(1) to T(N);

defining a plurality N of counters, PT(1) to PT(N), each of which, PT(i) with i being an integer comprised between 1 and N, being incremented when the buffer state is determined to be at any of the states ST(i) to ST(N), whereby the measurement of the time distribution of the occupancy of the at least one buffer during a predetermined monitoring time period is achieved by obtaining a set of N values PT(1) to PT(N) indicating respectively the percentage of packets that have armed during the monitoring period while the amount of packets stored in the buffer at the packet arrival instant was equal or greater than threshold T(1) to T(N), respectively.

2. The connection bandwidth management process of claim 1, wherein the number N of buffer occupancy thresholds, of buffer states, and counters is four, and wherein the buffer states ST(1) to ST(4) are defined as follows:

ST(1): Buffer state when T(1)<=Qsize<T(2);
ST(2): Buffer state when T(2)<=Qsize<T(3);
ST(3): Buffer state when T(3)<=Qsize<T(4);
ST(4): Buffer state when Qsize >=T(4);
where Qsize refers to the amount of packets stored in the buffer at a given instant.

3. The connection bandwidth management process of claim 2, wherein the buffer occupancy thresholds T(1) to T(4) are indicative respectively of 5 percent, 20 percent, 40 percent, and 70 percent of the total occupancy of the buffer.

4. The connection bandwidth management process of claim 1, wherein the link monitoring data includes for each of the monitored links an average link utilization data for each of the links, the average link utilization data relying on the counting of packets during a predetermined monitoring time period before they are boarded on the link.

5. The connection bandwidth management process of claim 1, wherein the step of determining whether the link monitoring data for the selected link satisfies at least one predetermined condition, is achieved by testing the buffer occupancy time distribution data and the average link utilization data of the selected link.

6. The connection bandwidth management process of claim 5, further using, for each selected link, the percentage of packets discarded during the predetermined monitoring time period, to determine whether the at least one predetermined condition is satisfied.

7. The connection bandwidth management process of claim 1, further comprising the steps of;

defining, for each communication link, a first parameter indicative of the ratio of oversubscription currently applied to the link, and a second parameter indicative as to whether or not the link has been passed through the connection bandwidth management process, with the first parameter being expressed in percentage of oversubscription and the second parameter being initialized to a value corresponding to the first parameter divided by 100;

defining for each connection a third parameter (CRF) indicative as to whether the connection bandwidth has been already reallocated or not, with the third parameter being initialized to one at connection setup;

comparing for each connection boarded over the selected link, the third parameter to the second parameter of the selected link;

keeping the connection allocated bandwidth unchanged upon determining that the third parameter is equal or greater than the second parameter; and re-computing the connection bandwidth parameters whereby the connection bandwidth is reallocated, upon determining that the third parameter is equal or greater than the second parameter.

8. The connection bandwidth management process of claim 7, implemented in a Frame Relay network, wherein the connection bandwidth parameters which are recomputed in the re-computing step comprise the committed information rate CIR, the committed burst size Bc, and the excess burst size Be.

9. The connection bandwidth management process of claim 8, wherein the connection bandwidth parameters CIR, Bc, Be are recomputed according to the following formula:

$$NCIR = \frac{CIR}{LRF}$$

with CIR being the original CIR allocated at connection setup, and NCIR denoting the re-computed CIR; and $$NBc = \frac{Bc}{LRF} \text{ and } NBe = (Bc - NBc) + Be$$

with NBc and NBe respectively denoting the re-computed Bc and the re-computed Be, such that the same amount of traffic is accepted through the network for the connection after its committed information rate CIR has been re-computed.

10. The connection bandwidth management process of claim 1, wherein the step of reallocating the bandwidth initially allocated to each of the connections boarded on the selected link is performed through commands transmitted from the network monitoring center to the origin switching node in which the connection was originally set up.

11. A data processing system for use in a high speed packet switching network having a plurality of switching nodes interconnected through a plurality of communication links, each of the switching nodes having means for switching packets from at least one input link to at least one output link, each of the output links being coupled to at least one buffer in the switching node for queuing packets before they are transmitted over the output link, each of the communication links supporting the traffic of a plurality of user connections statistically multiplexed over the link, each user connection being allocated an initial agreed-upon bandwidth through the network, with each of the communication links being possibly oversubscribed, the data processing system comprising:

means for periodically receiving, in a network monitoring center, link monitoring data on the communication links, and storing the link monitoring data in a computer memory in the network monitoring center;

means for selecting one monitored link and retrieving the corresponding link monitoring data from the computer memory;

means for analyzing the link monitoring data for the selected link, wherein the link monitoring data includes, for each of the monitored links a time distribution of the occupancy of the buffer measured during a predetermined monitoring time period;

means for determining whether the selected link is oversubscribed or not;

means for, upon determining that the selected link is oversubscribed and that the link monitoring data for the selected link satisfies at least one predetermined condition, reallocating the bandwidth initially allocated to each of the connections boarded on the selected link, such that the sum of the reallocated bandwidth of the connections boarded on the selected link is less or equal to the total bandwidth capacity of the selected link; and means for obtaining the time distribution of the occupancy of the buffer by:

defining a plurality N, with N being an integer, of buffer occupancy thresholds T(1) to T(N), each of the thresholds being indicative of a ratio of the total occupancy of the buffer:

defining a plurality N of buffer states ST(1) to ST(N), each of the states being indicative of the amount of packets stored in the buffer at a given instant in relation to the thresholds T(1) to T(N):

defining a plurality N of counters, PT(1) to PT(N each of which, PT(i) with i being an integer comprised between 1 and N, being incremented when the buffer state is determined to be at any of the states ST(i) to ST;

whereby the measurement of the time distribution of the occupancy of the at least one buffer during a predetermined monitoring time period is achieved by obtaining a set of N values PT(1) to PT(N) indicating respectively the percentage of packets that have arrived during the monitoring period while the amount of packets stored in the buffer at the packet arrival instant was equal or greater than threshold T(1) to T(N), respectively.

12. The data processing system of claim 11, wherein the number N of buffer occupancy thresholds, of buffer states, and counters is four, and wherein the buffer states ST(1) to ST(4) are defined as follows:

ST(1): Buffer state when T(1)<=Qsize<T(2);

ST(2): Buffer state when T(2)<=Qsize<T(3);

ST(3): Buffer state when T(3)<=Qsize<T(4);

ST(4): Buffer state when Qsize>=T(4);

where Qsize refers to the amount of packets stored in the buffer at a given instant.

13. The data processing system of claim 12, wherein the buffer occupancy thresholds T(1) to T(4) are indicative respectively of 5 percent, 20 percent, 40 percent, and 70 percent of the total occupancy of the buffer.

14. The data processing system of claim 11, wherein the link monitoring data includes for each of the monitored links an average link utilization data for each of the links, the average link utilization data relying on the counting of packets during a predetermined monitoring time period before they are boarded on the link.

15. The data processing system of claim 11, wherein the means for determining whether the link monitoring data for the selected link satisfies at least one predetermined condition, tests the buffer occupancy time distribution data and the average link utilization data of the selected link.

16. The data processing system of claim 15, further including means, for each selected link, that use the percentage of packet discarded during the predetermined monitoring time period to determine whether the at least one predetermined condition is satisfied.

17. The data processing system of claim 11, further comprising.

means for defining, for each communication link, a first parameter indicative of the ratio of oversubscription currently applied to the link, and a second parameter indicative as to whether or not the link has been passed through the connection bandwidth management process, with the first parameter being expressed in percentage of oversubscription and the second parameter being initialized to a value corresponding to the first parameter divided by 100;

means for defining for each connection a third parameter (CRF) indicative as to whether the connection bandwidth has been already reallocated or not, with the third parameter being initialized to one at connection setup;

means for comparing for each connection boarded over the selected link, the third parameter to the second parameter of the selected link;

means for keeping the connection allocated bandwidth unchanged upon determining that the third parameter is equal or greater than the second parameter; and means for re-computing the connection bandwidth parameters whereby the connection bandwidth is reallocated, upon determining that the third parameter is equal or greater than the second parameter.

18. The data processing system of claim 17, wherein the data processing system is implemented in a Frame Relay network, and wherein the connection bandwidth parameters which are re-computed in the re-computing step comprise the committed information rate CIR, the committed burst size Bc, and the excess burst size Be.

19. The data processing system of claim 18, wherein the connection bandwidth parameters CIR, Bc, Be are re-computed according to the following formula:

$$NCIR = \frac{CIR}{LRF}$$

with CIR being the original CIR allocated at connection setup, and NCIR denoting the re-computed CIR; and $$NBc = \frac{Bc}{LRF} \text{ and } NBe = (Bc - NBc) + Be$$

with NBc and NBe respectively denoting the re-computed Bc and the re-computed Be, such that the same amount of traffic is accepted through the network for the connection after its committed information rate CIR has been re-computed.

20. The data processing system of claim 11, wherein the means for reallocating the bandwidth initially allocated to each of the connections boarded on the selected link use commands transmitted from the network monitoring center to the origin switching node in which the connection was originally set up.

* * * * *